United States Patent Office 3,595,742
Patented July 27, 1971

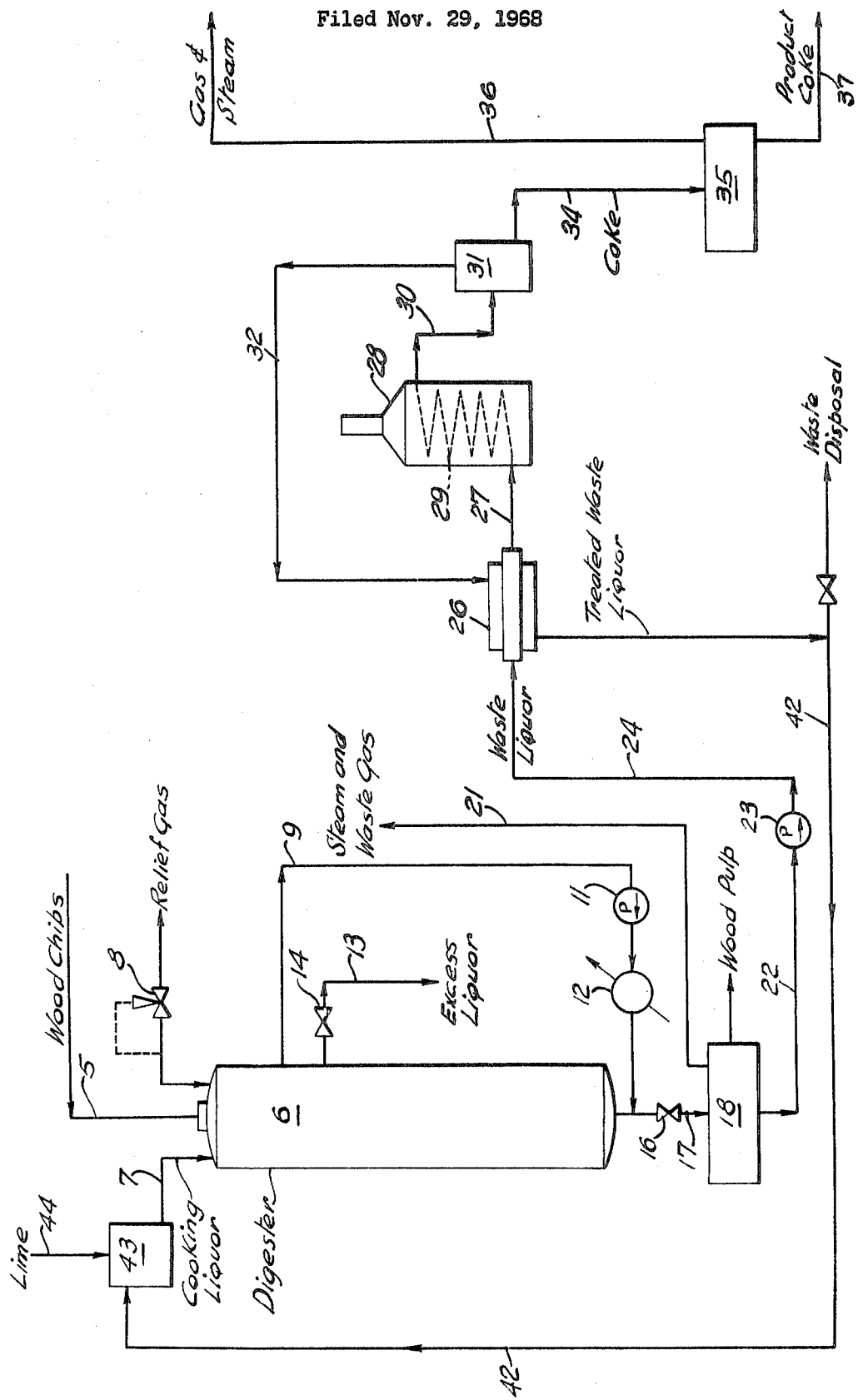

3,595,742
COKING OF WASTE LIQUORS
Howard V. Hess, Glenham, and Edward L. Cole, Fishkill, N.Y., assignors to Texaco Inc., New York, N.Y.
Filed Nov. 29, 1968, Ser. No. 780,081
The portion of the term of the patent subsequent to Apr. 21, 1987, has been disclaimed
Int. Cl. D21c 11/12
U.S. Cl. 162—30                                            8 Claims

ABSTRACT OF THE DISCLOSURE

Process for treatment of waste liquors from pulp and paper mills wherein waste liquor is heated under turbulent flow conditions in a tubular heater to a temperature above about 450° F. under pressure sufficient to prevent vaporization of water and form a water insoluble solid product, or coke, which is separated from treated aqueous liquid effluent of low COD suitable for reuse in the process or for disposal in lakes and streams without significant water pollution.

---

This invention relates to a process for the treatment of aqueous industrial wastes from pulp mills.

The process of this invention effects removal of organic matter from aqueous pulp mill waste liquors by carbonization with heat under elevated pressure in the absence of free oxygen. In one of its more specific aspects, the process of this invention comprises heating aqueous organic waste liquor from pulp mills substantially in the absence of free oxygen to a temperature in the range of 400 to 700° F. at a pressure in the range of 300 to 3200 p.s.i.g. for a period of 0.5 to 10 minutes in a tubular heating zone under conditions of highly turbulent flow to form a granular solid coke. Solid coke is removed from the treated effluent discharged from the turbulent flow heating zone to yield an aqueous effluent of low chemical oxygen demand (COD). The aqueous effluent may be used for the production of cooking liquor for the pulping process, or discharged as industrial waste water which may be used in the plant, e.g. as cooling water, or discharged into ponds, lakes or streams without substantial water pollution.

The term "coke" is used herein in its broad sense to denote a water-insoluble carbonized solid residue of substantially reduced hydroxyl and carboxyl content as compared with the organic material in the feed to the process. The term "pulp mill waste liquor" is used in a broad sense to denote used cooking liquor from the treatment of wood chips in any of various pulping mill processes.

In the production of pulp and paper, wood is treated with chemicals to remove lignin binder from the cellulose fibers of the wood. In the pulping process, about one-half the dry weight of the tree processed is dissolved in the pulping liquor and only about one-half is recovered as pulp. The soluble portion of the wood, most of which is discarded as waste, presents serious disposal problems. According to recent reports in the trade literature, sulfite liquor from over 100 pulp mills in the United States and Canada is disposed of by pumping the waste liquor into the nearest river or other body of water. Legislation in many states now prohibits the discharge of sulfite waste liquor into streams, resulting in efforts by mills to find the best method of utilizing or disposing of the waste liquor.

Paper pulp is produced by three principal processes, namely, the kraft or sulfide process, the sulfite or bisulfite process, and the soda process. The soda process uses sodium hydroxide to dissolve non-cellulose materials from the wood, while the sulfite process utilizes an acid cooking liquor described in somewhat more detail hereinafter. The kraft pulp process employs a mixture of sodium hydroxide and sodium sulfide.

Acid cooking liquor for the sulfite process is usually prepared by reaction between sulfur dioxide and limestone or dolomite in the presence of water to form calcium bisulfite $Ca(HSO_3)_2$. Instead of limestone, which forms a calcium based sulfite acid liquor, the acid cooking liquor may be prepared from ammonium carbonate, ammonium hydroxide, magnesium carbonate, magnesium hydroxide, or the carbonate, or sulfite, or hydroxide of sodium. In some systems, dolomitic lime is used in place of high-calcium lime. Dolomitic limestone, containing normally 54% $CaCO_3$ and 46% $MgCO_3$, reacts readily with sulfur dioxide to produce mixed bisulfites of calcium and magnesium.

Various methods have been devised for disposing of waste liquors from pulp and paper mills. A number of processes involve concentrating the liquor in multiple effect evaporators to increase the concentration of the solids to a value in the neighborhood of 60 weight percent. In some processes, the concentrated liquor is sprayed into a recovery furnace where it is burned to generate steam. In the kraft process, sodium sulfate and sulfur may be added to the liquor before it is fed into the recovery furnace. Chemicals recovered from the slag from the furnace, i.e. sodium sulfide and sodium carbonate, are mixed with additional chemicals, lime and sodium hydroxide, to make up white liquor for the pulping process.

Spent liquors from pulp plants also may be processed in a fluid bed system in which concentrated waste liquor is sprayed into contact with hot granular particles suspended in a moving stream of air or steam in a fluidized bed maintained at a temperature of about 1300° F. Such disposal systems, while effective, often create problems of air pollution resulting from liberation of gaseous sulfur compounds to the atmosphere and require large capital investments.

It is an object of this invention to provide an improved method for the treatment of waste liquor from pulp and paper mills economically and to produce an effluent water which may be discharged into streams without appreciable water or air pollution.

The present process involves a novel and improved method of treating waste liquors from pulping processes. In the process of this invention, waste liquor is heated in a tubular reactor or coking zone in the absence of free oxygen to an elevated temperature in the range of 450 to 700° F. preferably in the range of 500 to 625° F., under sufficient pressure to prevent substantial vaporization of water, preferably under conditions of highly turbulent flow in the tubular reactor system.

When high turbulence levels are maintained in the tubular reactor, uniform dispersion and distribution of coke particles in the aqueous stream takes place as the coke is formed during the heat treatment and deposition of coke on the walls of the reactor is minimized. In this process, carbonization is substantially complete within a period of about 0.5 to 10 minutes at 600° F. In a preferred embodiment of this invention, the outlet temperature of treated liquid leaving the tubular coking zone is maintained within the range of about 550 to 650° F. The waste liquid undergoing treatment is maintained at elevated temperature above 400° F. for a sufficient period of time, e.g. one minute, to obtain substantially complete carbonization of organic compounds contained therein to water insoluble solids or coke.

The flow of liquid in the tubular reactor may be laminar or turbulent and for a given tube reactor the type of flow depends on the quantity of fluid flowing through the reactor. Turbulent flow is most desirable for coking as coke deposition on the reactor walls is minimized, thus assuring long operational life of the tubular reactor system. A useful relationship that substantially indicates the type of flow in a tube is the Reynolds number. The Reynolds number is defined as:

$$N_{Re} = DV\rho/\mu$$

where:

$N_{Re}$ = Reynolds number
$D$ = Inside diameter of tube, ft.
$V$ = Average linear velocity, ft./sec.
$\rho$ = Fluid density, lb./cu. ft.
$\mu$ = Fluid viscosity, lb./(ft.) (sec.)

Preferably Reynold's numbers above 4000 are maintained in the tubular reactor. The tubular reactor suitably has an internal diameter within the range of one half to four inches. The length of the reactor tube is preferably such that the average residence time of liquid in the tube is at least one minute. Pressure, in itself, is not critical in the heating step. The inter-relationship of temperature and pressure with respect to vaporization of water is well known. Generally, it is desirable to operate the heating step so that the pressure at the outlet from the tubular reactor is near or only slightly greater than the vaporization temperature of water at the reactor outlet. To conserve heat, it is generally desirable to maintain the pressure at the outlet of the tubular heating zone higher than the vapor pressure of water at the outlet temperature of the heating zone.

The process of this invention will be better understood by reference to the accompanying figure illustrating diagrammatically a preferred embodiment of the present invention as applied to the treatment of waste liquor from a calcium based sulfite pulp mill.

With reference to the figure, wood chips from a suitable source of supply, such as fir, are introduced from line 5 into digester 6 where they are cooked in cooking liquor supplied through line 7. Generally the chips are processed at a temperature in the range of 265 to 300° F. at a pressure in the range of 70 to 100 p.s.i.g. for a period of 6 to 12 hours. In this specific example, calcium based sulfite cooking liquor containing typically 7% by weight $SO_2$ of which 4.5% is combined sulfurous acid, and 2.5% as calcium bisulfite is employed in digester 6. The acid cooking liquor usually contains excess or uncombined sulfur dioxide.

Digester 6 is a large pressure vessel, suitably lined with acid-proof brick or stainless steel. After a charge of wood chips amounting to several tons of wood is introduced into the digester, cooking acid is pumped in through line 7 while air is discharged from the upper part of the digester through a suitable relief valve 8 which serves as a pressure limiting relief valve during the cooking process. When the digester has been charged with the cooking liquor, the cooking liquor is circulated through line 9 by pump 11 to heater 12 and reintroduced into the lower part of digester 6. The wood chips are gradually heated to a temperature of the order of 230° F., usually over a period of 1 to 2 hours, after which the temperature is brought up to the processing temperature.

During the cooking process, the level of liquor in the digester is maintained below the top of the vessel by withdrawing some of the cooking liquor through line 13 as controlled by valve 14.

At the end of the cooking period, the pressure in the digester is reduced, suitably to about 25 pounds per square inch gauge, by withdrawal of gas and steam through valve 8, after which blow valve 16 at the bottom of the digester is opened and the contents of the reactor discharged through line 17 into blow pit 18. Steam and gas released from the pulp during the blowing process are discharged through line 21 to recovery system in which steam is condensed and sulfur dioxide dissolved in water and recovered. Gases released from the relief valve 8 at the top of the digester during the cooking process are also treated for the recovery of sulfur dioxide which is returned to the system with the acid cooking liquor. Product wood pulp from the process is discharged through line 19 for further processing.

It is to be understood that the process for cooking and digesting wood chips for the production of pulp, the separation of wood pulp from waste liquor and recovery of waste gases from the digester effluents form no part of the present invention but are intended to be representative of conventional commercial operations which are described herein to show the relationship of the present process to the commercial pulping plant operations. It is to be understood also that waste liquors from pulp mills employing cooking liquors other than the calcium based sulfite liquor of this example may be employed in the process of this invention.

In a preferred embodiment of the present invention, waste liquor is drawn from blow pit 18 through line 22 and passed by pump 23 through line 24 to heat exchanger 26 wherein the waste liquor is heated by exchanging with hot coke free liquid from separator 31 through line 32. The waste liquor from exchanger 26 is passed by line 27 into heated tubular reactor 29 in furnace 28. In the tubular reaction zone 29, the waste liquor is heated to a temperature in the desired coking temperature range, suitably about 550° F., at a pressure sufficient to prevent vaporization of water, e.g. about 1065 p.s.i.g. During its passage through the tubular reactor heating zone, the temperature is held above 400° F. for a period of time usually in the range of 1 to 10 minutes, sufficient to precipitate the major portion of the water-soluble organic material contained therein as water-insoluble solids.

Without wishing to limit the present invention in any way, the following explanation is offered as a possible mechanism for the relatively fast reaction obtained in the present process. The highly turbulent flow of the liquid passing through the tubular coking zone results in very rapid heat transfer rates to the liquid, and, at the same time, as coke particles are formed they are suspended in the liquid and carried through the reactor or coking zone 29 without substantial accumulation of solids on the walls of the tubular coking zone.

Treated waste liquid is discharged from the outlet of the coking zone 29 and passed through line 30 into separation zone 31. Separator 31 effects a separation of the particulate coke from the liquid and may consist of a filter, a cyclone separator, a settler or a centrifuge. The treated liquor substantially free from coke is passed to line 32 and exchanger 26 wherein its heat content is lowered by exchange with waste liquor. The cooled coke free liquid from the exchanger passes to line 33 wherein it may be disposed of as waste water of relatively low COD or preferably it is reconstituted and mixed with fresh acid liquor and other suitable chemical reagents e.g., calcium oxide, calcium carbonate, and calcium hydroxide and introduced through line 41 into make-up tank 43.

The product coke from the separator 31 passes through line 32 to a blow vessel 33 wherein the hot coke is finally dried by vaporization of the water remaining in the coke after the separator. Generally the heat content of the coke is sufficient to supply the heat to effect such drying. Gas and steam are discharged through line 36.

The dried coke is removed to storage through line 37.

EXAMPLES 1-6

A spent kraft process waste liquor was treated in accordance with this invention in a series of tests in 5/8" ID stainless steel tubing using a high tin solder metal bath as a heating medium. The spent waste liquor used as charge had a COD of 175.6 g./l. (grams oxygen per liter). Reduction in COD is evident by comparison of this value with those of the treated liquid products as shown in the following tabulation:

| Example | 1 | 2 | 3 | 4 | 5 | 6 |
|---|---|---|---|---|---|---|
| Operating conditions: | | | | | | |
| Pressure, p.s.i.g | 700 | 1,050 | 1,575 | 1,500 | 1,850 | 240 |
| Temperature, °F | 500 | 550 | 600 | 600 | 625 | 400 |
| Time, min.[1] | 10 | 10 | 1 | 5 | 1 | 60 |
| Product liquid: COD, g./l. | 134.5 | 90.9 | 62.3 | 53.0 | 59.1 | [2] |

[1] Time reported is time of treatment at indicated temperature (3.5 minutes were required to heat the charge to the indicated operating temperature).
[2] No charge.

Materials contributing to the high COD of the waste liquor from the treated liquid as a readily filterable particulate coke. The value of using the higher temperature is evident from the above examples.

EXAMPLES 7-9

A spent sulfite liquor was coked in a series of tests in a ½" ID stainless steel tube using a high tin solder metal bath as a heating medium. The spent sulfite liquor had the following properties:

COD g./l. ----------------------------- 153.5
Residue on evaporation, g./l. --------- 114.25
Total volatile, g./l. ----------------- 112.086
Fixed residue, g./l. ------------------ 2.164
Carbon, wt. percent ------------------- 5.0
Nitrogen, wt. percent ----------------- 0.32
Sulfur, wt. percent ------------------- 0.34

The effectiveness of the coking process for the removal of materials that contribute to high values at COD are shown below.

| Example | 7 | 8 | 9 |
|---|---|---|---|
| Operating conditions: | | | |
| Pressure, p.s.i.g | 1,050 | 1,050 | 240 |
| Temperature, °F | 550 | 550 | 400 |
| Time, min.[1] | 1 | 30 | 20 |
| Treated liquid product: COD g./l. | 15.1 | 15.9 | [2] |

[1] Time reported is time of treatment at indicated temperature (3.5 minutes were required to heat the charge to the operating temperature).
[2] No coke.

EXAMPLE 10

An ammonia based sulfite process plant produces on the average 100,000 pounds per hour of spent sulfite liquor having the following properties:

Spent ammonia based sulfite

Pulping liquor

COD, g./l. ---------------------------- 153.5
Residue on evaporation, g./l. --------- 114.25
Total volatile, g./l ------------------ 112.09
Fixed residue, g./l. ------------------ 2.16
Carbon, wt. percent ------------------- 5.0
Nitrogen, weight percent -------------- 0.32
Sulfur, wt. percent ------------------- 0.34

The spent liquor from the pulping process is delievered at about 200° F. and successively heat exchanged with low pressure steam and treated hot (545° F.) liquor from the coke-liquid separator of the subject process heating the waste liquor to a temperature in the range of 390-410° F. The hot spent liquor from the exchanger is then pumped into and through four sections of three inch stainless steel tubes held in a fired heater, where the temperature of the spent liquor is raised to 550° F. and held for one minute substantially at the coking temperature of 550° F. The fired heater is of conventional design except the tubes of the coking section are shielded from the open flame of the preheat section. The coking section consists of four 200-foot length of 3-inch stainless steel tubing connected by return bends. With 100,000 pounds per hour of spent liquor, the calculated Reynolds number is: $N_{Re}=6.8 \times 10^5$, a value well in the turbulent flow region. The residence time at the coking temperature of about 550° F. is one minute. The effluent from the tubular coking zone consists of a slurry of particulate coke in liquid from which the liquid is separated readily in a cyclone separator.

The process has the ability to handle variations in charge rate at ±15 percent and similar variations in the local solids content of the waste liquor. Typical products yields and compositions under the above described operating conditions are shown in the following tabulation.

COKER PRODUCTS ANALYSIS

| Product | Treated product liquid | Wet coke from cyclone | Dry coke |
|---|---|---|---|
| Yield, basis charge, wt. percent | 84.8 | 15.2 | 6.9 |
| COD, g./l. | 10.9 | | |
| Analysis: | | | |
| Residue on evaporation, g./l. | 14.9 | | |
| Total volatile, g./l. | 12.3 | | |
| Fixed residue, g./l. | 1.56 | | |
| pH | 3.9 | | |
| Nitrogen, wt. percent | 0.18 | | 3.6 |
| Carbon, wt. percent | | | 62.9 |
| Sulfur, wt. percent | | | 56.7 |
| Ash, wt. percent | | | 3.3 |

We claim:

1. A process for the treatment of waste liquor from pulp and paper mills containing organic matter dissolved from wood, consisting of:
    passing said liquor into and through a tubular coking zone under conditions of turbulent flow characterized by a Reynolds number greater than 2000;
    said Reynolds number being identified by the relation:

$$N_{Re}=DV\rho/\mu$$

wherein $N_{Re}$=Reynolds number
D=Inside diameter of the tubular zone in ft.
V=Average linear velocity in ft./sec.
$\rho$=Fluid density in lb./cu. ft.
$\mu$=Fluid viscosity in lb./(ft.) (sec.)

heating said liquor in said zone to a temperature in the range of about 450 to about 700° F. under a pressure above the vapor pressure of water at said temperature; maintaining the outlet temperature of the treated liquor leaving said zone within the range of about 550 to about 650° to effect carbonization of said organic matter to form water insoluble solid, particulate coke; discharging effluent treated liquor containing coke from said coking zone into a separation zone; and separating said coke from said effluent liquor to give an aqueous liquid of reduced organic content.

2. The process according to claim 1, wherein the pressure in said coking zone is within the range of 500 to 3000 p.s.i.g.

3. The process according to claim 1, wherein said waste liquor in said coking zone is maintained at a temperature above about 500° F. for a period of time within the range of 0.5 to 20 minutes.

4. The process according to claim 1, wherein said aqueous liquid effluent from said separation zone is passed in indirect heat exchange with waste liquor and thereafter returned to a pulp processing plant.

5. The process according to claim 1, wherein said waste liquor is black liquor from kraft pulping process.

6. The process according to claim 1, wherein said waste liquor is a sulfite pulping process waste liquor.

7. The process according to claim 1, wherein said coke is separated from said liquor by centrifuging.

8. The process according to claim 1, wherein said coke is separated from said liquor by settling.

References Cited

UNITED STATES PATENTS

| | | | |
|---|---|---|---|
| 2,752,243 | 6/1956 | Barton et al. | 162—31 |
| 2,911,288 | 11/1959 | Viles | 23—262X |
| 3,003,908 | 10/1961 | Mannbro | 162—36X |
| 3,037,901 | 6/1962 | Thomsen | 162—36X |
| 3,272,739 | 9/1966 | Earle et al. | 210—71X |
| 3,507,788 | 4/1970 | Cole et al. | 210—63 |

FOREIGN PATENTS

| | | | |
|---|---|---|---|
| 644,850 | 7/1962 | Canada | 162—36 |

S. LEON BASHORE, Primary Examiner

A. L. CORBIN, Assistant Examiner

U.S. Cl. X.R.

159—47WL; 162—36; 210—56, 63, 71